(12) United States Patent
Tamai

(10) Patent No.: US 11,165,278 B2
(45) Date of Patent: Nov. 2, 2021

(54) UNINTERRUPTIBLE POWER SUPPLY SYSTEM AND UNINTERRUPTIBLE POWER SUPPLY

(71) Applicant: FUJI ELECTRIC CO., LTD., Kawasaki (JP)

(72) Inventor: Yasuhiro Tamai, Chiba (JP)

(73) Assignee: FUJI ELECTRIC CO., LTD., Kawasaki (JP)

( * ) Notice: Subject to any disclaimer, the term of this patent is extended or adjusted under 35 U.S.C. 154(b) by 0 days.

(21) Appl. No.: 17/000,530

(22) Filed: Aug. 24, 2020

(65) Prior Publication Data

US 2020/0389046 A1    Dec. 10, 2020

Related U.S. Application Data

(63) Continuation of application No. PCT/JP2019/028631, filed on Jul. 22, 2019.

(30) Foreign Application Priority Data

Sep. 26, 2018    (JP) .............................. JP2018-180586

(51) Int. Cl.
*H02J 9/06* (2006.01)
*H02J 3/40* (2006.01)

(52) U.S. Cl.
CPC ................. *H02J 9/062* (2013.01); *H02J 3/40* (2013.01)

(58) Field of Classification Search
CPC ........................... H02J 9/04–08; H02J 3/38–50
See application file for complete search history.

(56) References Cited

U.S. PATENT DOCUMENTS

| 9,755,457 | B2 | 9/2017 | Lee et al. | |
|---|---|---|---|---|
| 2003/0048006 | A1* | 3/2003 | Shelter, Jr. .............. | H02J 9/062 307/64 |
| 2005/0036253 | A1* | 2/2005 | Tian ......................... | H02J 3/38 361/66 |
| 2005/0043859 | A1* | 2/2005 | Tsai ........................ | H02J 9/062 700/286 |
| 2009/0072623 | A1* | 3/2009 | Liao ........................ | H02J 9/061 307/65 |
| 2012/0086269 | A1* | 4/2012 | Nakano ................... | H02J 9/062 307/23 |

(Continued)

FOREIGN PATENT DOCUMENTS

| JP | 2002-136000 A | 5/2002 |
|---|---|---|
| JP | 2010-148297 A | 7/2010 |

(Continued)

OTHER PUBLICATIONS

English machine translation of JP6678342B2, corresponding to JP2017158264A published Sep. 7, 2017. (Year: 2017).*

(Continued)

*Primary Examiner* — Hal Kaplan
*Assistant Examiner* — David A Shiao
(74) *Attorney, Agent, or Firm* — Manabu Kanesaka

(57) ABSTRACT

In an uninterruptible power supply system, an uninterruptible power supply operates based on a command to an inverter held in a holder before an abnormality occurs in communication when the abnormality occurs in the communication between an operation board and the uninterruptible power supply.

7 Claims, 6 Drawing Sheets

(56) References Cited

U.S. PATENT DOCUMENTS

| | | | | |
|---|---|---|---|---|
| 2014/0049104 A1* | 2/2014 | Hagihara | ............... | H02J 9/061 |
| | | | | 307/23 |
| 2015/0076903 A1* | 3/2015 | Kanayama | ............... | H02J 3/40 |
| | | | | 307/24 |
| 2017/0163086 A1* | 6/2017 | Bach | ...................... | H02J 9/061 |
| 2018/0076659 A1* | 3/2018 | Giuntini | ................. | H02J 9/062 |
| 2019/0157901 A1 | 5/2019 | Tamai | | |

FOREIGN PATENT DOCUMENTS

| | | |
|---|---|---|
| JP | 2017-158264 A | 9/2017 |
| JP | 6262675 B2 | 1/2018 |
| WO | 2018/150726 A1 | 8/2018 |

OTHER PUBLICATIONS

PCT/ISA/210, "International Search Report for International Application No. PCT/JP2019/028631," dated Sep. 10, 2019.
PCT/ISA/237, "Written Opinion by the International Search Authority for International Application No. PCT/JP2019/028631," dated Sep. 10, 2019.

* cited by examiner

34

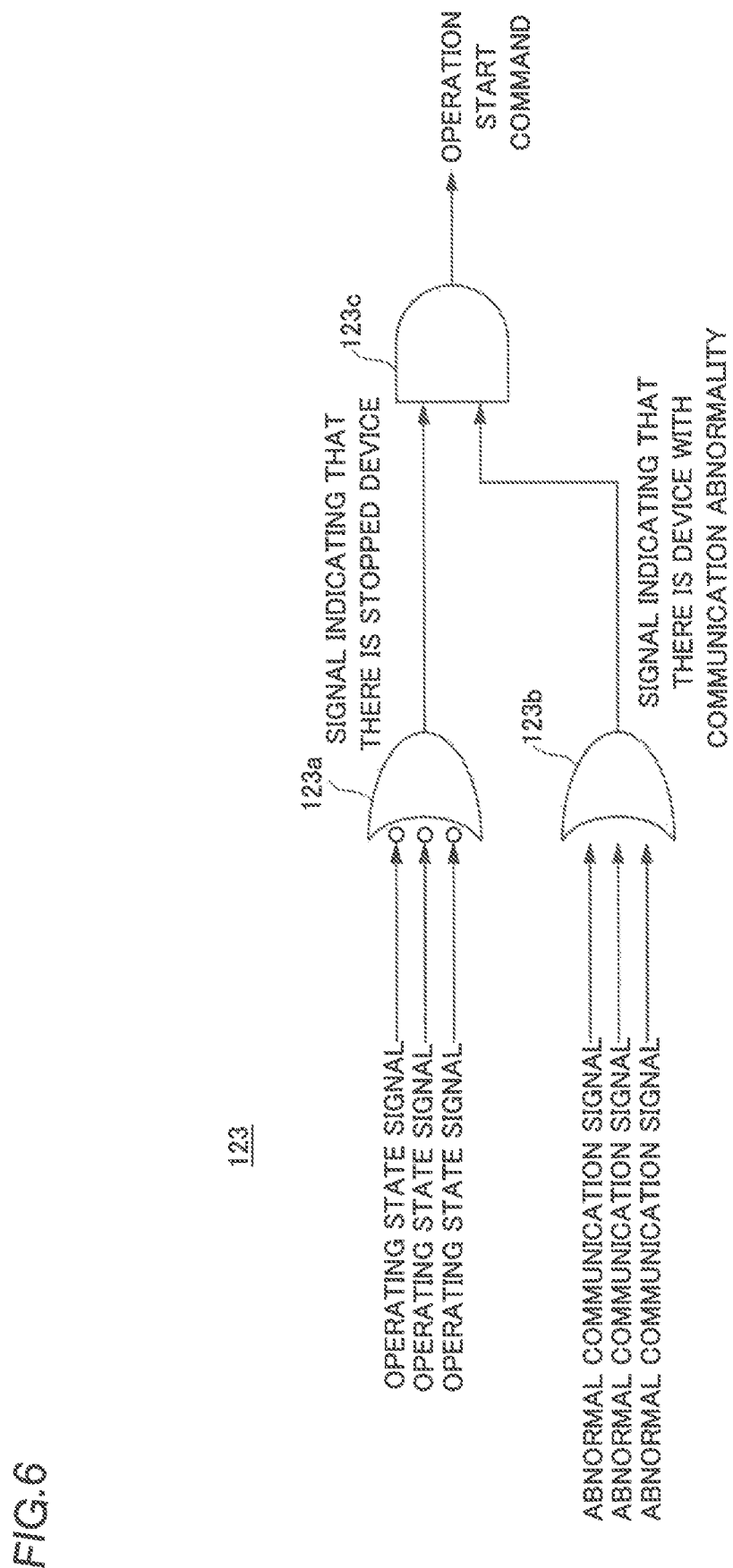

UNINTERRUPTIBLE POWER SUPPLY SYSTEM AND UNINTERRUPTIBLE POWER SUPPLY

CROSS-REFERENCE TO RELATED APPLICATION

This application is a continuation of PCT application PCT/JP2019/028631, filed on Jul. 22, 2019, which is based upon and claims priority of Japanese patent application No. 2018-180586, filed on Sep. 26, 2018, the entire contents of which are incorporated herein by reference.

BACKGROUND OF THE INVENTION

Field of the Invention

The present invention relates to an uninterruptible power supply system and an uninterruptible power supply, and more particularly, it relates to an uninterruptible power supply system including an uninterruptible power supply between an AC power supply and a load, and an uninterruptible power supply.

Description of the Background Art

An uninterruptible power supply system including an uninterruptible power supply (uninterruptible power supply module) provided between an AC power supply and a load is known in general. Such an uninterruptible power supply system is disclosed in Japanese Patent No. 6262675, for example.

Japanese Patent No. 6262675 discloses an uninterruptible power supply system including a plurality of uninterruptible power supply modules connected in parallel. Each of the uninterruptible power supply modules includes a converter that converts AC power into DC power, and an inverter that converts the DC power converted by the converter to AC power.

Although not disclosed in Japanese Patent No. 6262675, a conventional uninterruptible power supply system as disclosed in Japanese Patent No. 6262675 includes an operation board for controlling a plurality of uninterruptible power supply modules. The operation board includes a controller that controls the operation of the entire uninterruptible power supply system, an operation panel, etc. The controller of the operation board transmits a command to each of the uninterruptible power supply modules via communication. Each of the uninterruptible power supply modules operates based on the transmitted command. For example, the inverter of each of the uninterruptible power supply modules is driven based on the transmitted command.

In the conventional uninterruptible power supply system as disclosed in Japanese Patent No. 6262675, communication between the operation board and the uninterruptible power supply modules may not be normally performed due to noise, for example. In this case, the command transmitted from the operation board to each of the uninterruptible power supply modules becomes abnormal, or the command is not transmitted from the operation board to each of the uninterruptible power supply modules. Consequently, the uninterruptible power supply modules may malfunction. Therefore, in the conventional uninterruptible power supply system as disclosed in Japanese Patent No. 6262675, when communication between the operation board and the uninterruptible power supply modules cannot be normally performed, the uninterruptible power supply modules (uninterruptible power supply) that cannot normally perform communication are stopped. However, when the uninterruptible power supply modules are stopped, power supplied to a load becomes insufficient (power supply capacity decreases).

SUMMARY OF THE INVENTION

The present invention has been proposed in order to solve the aforementioned problem, and an object of the present invention is to provide an uninterruptible power supply system and an uninterruptible power supply capable of significantly reducing or preventing a decrease in power supply capacity even when communication between an operation board and the uninterruptible power supply is abnormal.

In order to attain the aforementioned object, an uninterruptible power supply system according to a first aspect of the present invention includes an uninterruptible power supply provided between an AC power supply and a load, and an operation board that transmits a command to the uninterruptible power supply via communication. The uninterruptible power supply includes a converter that converts AC power supplied from the AC power supply into DC power, a power storage that stores the DC power converted by the converter, an inverter that converts the DC power supplied from the converter or the power storage into AC power, and a holder that holds the command to the inverter, and the uninterruptible power supply operates based on the command to the inverter held in the holder before an abnormality occurs in the communication when the abnormality occurs in the communication between the operation board and the uninterruptible power supply.

In the uninterruptible power supply system according to the first aspect of the present invention, as described above, the uninterruptible power supply operates based on the command to the inverter held in the holder before the abnormality occurs in the communication when the abnormality occurs in the communication between the operation board and the uninterruptible power supply. Accordingly, even when the abnormality occurs in the communication, the uninterruptible power supply operates based on the command to the inverter held in the holder before the abnormality occurs in the communication. Consequently, even when the communication between the operation board and the uninterruptible power supply is abnormal, a decrease in the power supply capacity can be significantly reduced or prevented.

In the aforementioned uninterruptible power supply system according to the first aspect, the operation board preferably transmits an output voltage amplitude command and an output voltage angle command to the inverter via the communication in every predetermined communication cycle, the holder preferably includes a first holder that holds the output voltage amplitude command, and a second holder that holds the output voltage angle command, and the uninterruptible power supply preferably operates based on a previous output voltage amplitude command held in the first holder and a previous output voltage angle command held in the second holder when the abnormality occurs in the communication. Accordingly, AC power can be output from the inverter based on the previous output voltage amplitude command held in the first holder and the previous output voltage angle command held in the second holder. Thus, a decrease in the AC power supply capacity can be significantly reduced or prevented.

In this case, the uninterruptible power supply preferably operates based on a preceding output voltage amplitude command held in the first holder and a value obtained by adding a predetermined value corresponding to an amount of angle change after holding of a preceding output voltage angle command to the preceding output voltage angle command held in the second holder when the abnormality occurs in the communication. Accordingly, the uninterruptible power supply operates based on the (preceding) output voltage amplitude command immediately before the occurrence of the abnormality in the communication, and thus AC power having an output voltage amplitude substantially similar to the output voltage amplitude immediately before the occurrence of the abnormality in the communication can be output. Furthermore, the predetermined value corresponding to the amount of angle change after holding of the preceding output voltage angle command is added to the preceding output voltage angle command held in the second holder, and thus AC power having an output voltage angle changed according to the elapse of the period can be output.

In the aforementioned uninterruptible power supply system according to the first aspect, the uninterruptible power supply preferably stops operating when the abnormality in the communication continues for a predetermined time, or the abnormality in the communication occurs for a predetermined number of times within a certain period in a state in which the uninterruptible power supply is operating based on a previous command to the inverter. Accordingly, it is possible to significantly reduce or prevent malfunction of the uninterruptible power supply due to the fact that a normal command is not transmitted from the operation board to the uninterruptible power supply. Thus, a decrease in the reliability of power supply to the load can be significantly reduced or prevented.

In the aforementioned uninterruptible power supply system according to the first aspect, the uninterruptible power supply preferably includes a plurality of uninterruptible power supplies connected in parallel to each other, and the operation board preferably receives, via the communication, information about whether each of the plurality of uninterruptible power supplies is operating or stopped, and stops an uninterruptible power supply with a communication abnormality among the plurality of uninterruptible power supplies and starts operation of a stopped uninterruptible power supply among the plurality of uninterruptible power supplies when the abnormality occurs in the communication between the operation board and one of the plurality of uninterruptible power supplies. Accordingly, even when the uninterruptible power supply with a communication abnormality is stopped, the operation of the stopped uninterruptible power supply is started instead. Therefore, a decrease in the power supply capacity can be further significantly reduced or prevented.

An uninterruptible power supply system according to a second aspect of the present invention includes a plurality of uninterruptible power supplies connected in parallel to each other between an AC power supply and a load, and an operation board that transmits a command to the plurality of uninterruptible power supplies via communication. Each of the plurality of uninterruptible power supplies includes a converter that converts AC power supplied from the AC power supply into DC power, a power storage that stores the DC power converted by the converter, and an inverter that converts the DC power supplied from the converter or the power storage into AC power, and the operation board receives, via the communication, information about whether each of the plurality of uninterruptible power supplies is operating or stopped, and stops an uninterruptible power supply with a communication abnormality among the plurality of uninterruptible power supplies and starts operation of a stopped uninterruptible power supply among the plurality of uninterruptible power supplies when an abnormality occurs in the communication between the operation board and one of the plurality of uninterruptible power supplies.

In the uninterruptible power supply system according to the second aspect of the present invention, as described above, the operation board receives, via the communication, the information about whether each of the plurality of uninterruptible power supplies is operating or stopped, and stops the uninterruptible power supply with the communication abnormality among the plurality of uninterruptible power supplies and starts the operation of the stopped uninterruptible power supply among the plurality of uninterruptible power supplies when the abnormality occurs in the communication between the operation board and one of the plurality of uninterruptible power supplies. Accordingly, even when the abnormality occurs in the communication, the operation of the stopped uninterruptible power supply is started. Therefore, it is possible to provide the uninterruptible power supply system capable of significantly reducing or preventing a decrease in the power supply capacity even when the communication between the operation board and one of the uninterruptible power supplies is abnormal.

An uninterruptible power supply according to a third aspect of the present invention is provided between an AC power supply and a load, and includes a converter that converts AC power supplied from the AC power supply into DC power, a power storage that stores the DC power converted by the converter, an inverter that converts the DC power supplied from the converter or the power storage into AC power, and a holder that holds a command to the inverter. The uninterruptible power supply operates based on the command to the inverter held in the holder before an abnormality occurs in communication when the abnormality occurs in the communication between an operation board that transmits the command to the uninterruptible power supply via the communication and the uninterruptible power supply.

As described above, the uninterruptible power supply according to the third aspect of the present invention operates based on the command to the inverter held in the holder before the abnormality occurs in the communication when the abnormality occurs in the communication between the operation board and the uninterruptible power supply. Accordingly, even when the abnormality occurs in the communication, the uninterruptible power supply operates based on the command to the inverter held in the holder before the abnormality occurs in the communication. Consequently, it is possible to provide the uninterruptible power supply capable of significantly reducing or preventing a decrease in the power supply capacity even when the communication between the operation board and the uninterruptible power supply is abnormal.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 6 is a circuit diagram of an automatic operation command creator according to the second embodiment.

DESCRIPTION OF THE PREFERRED EMBODIMENTS

Embodiments of the present invention are hereinafter described with reference to the drawings.

First Embodiment

The configuration of an uninterruptible power supply system 100 according to a first embodiment is now described with reference to FIGS. 1 to 4.

Figure 1:
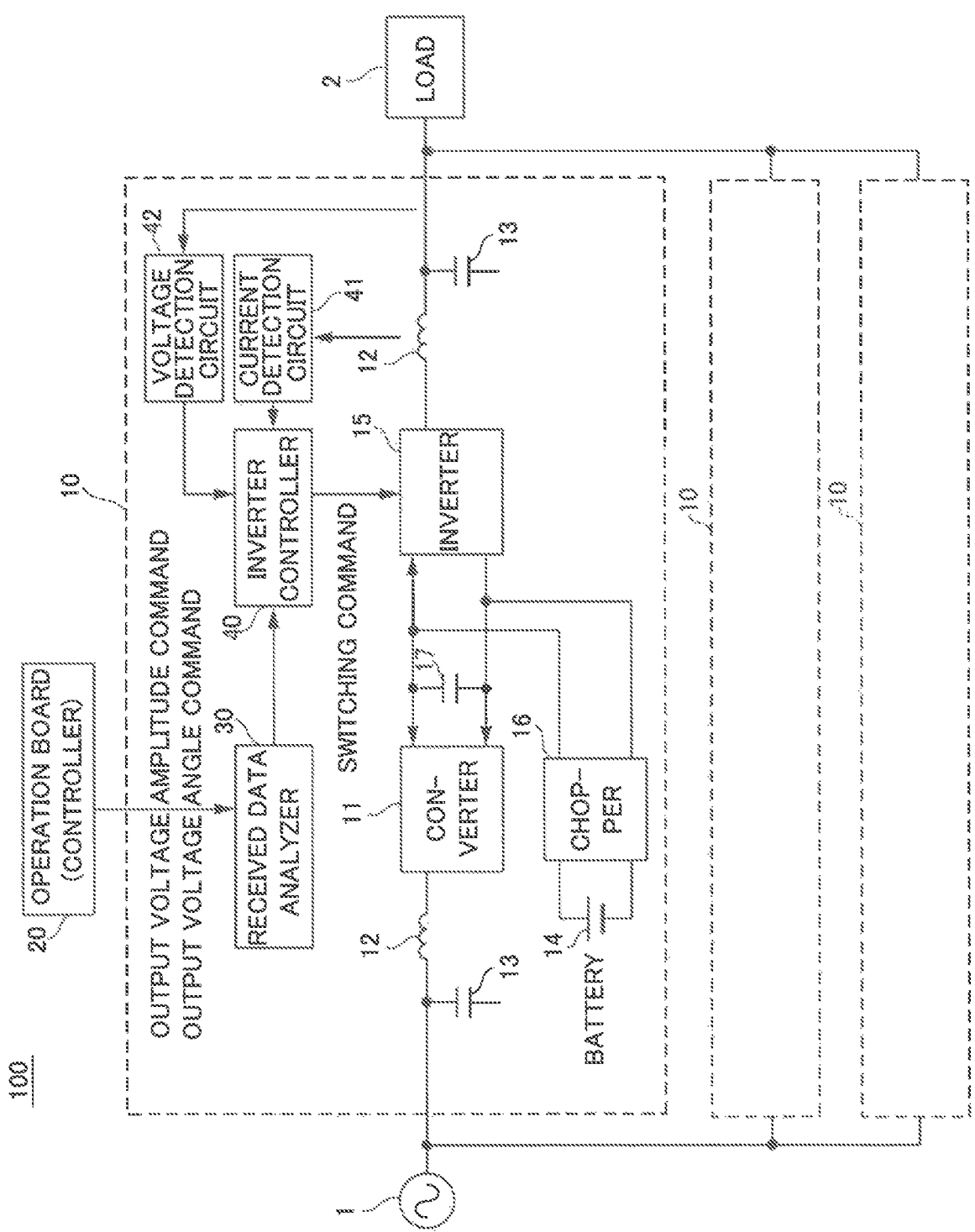
FIG. 1 is a block diagram of an uninterruptible power supply system according to a first embodiment.

As shown in FIG. 1, the uninterruptible power supply system 100 includes a plurality of uninterruptible power supplies 10. The plurality of uninterruptible power supplies 10 is connected in parallel to each other between an AC power supply 1 and a load 2.

Figure 2:
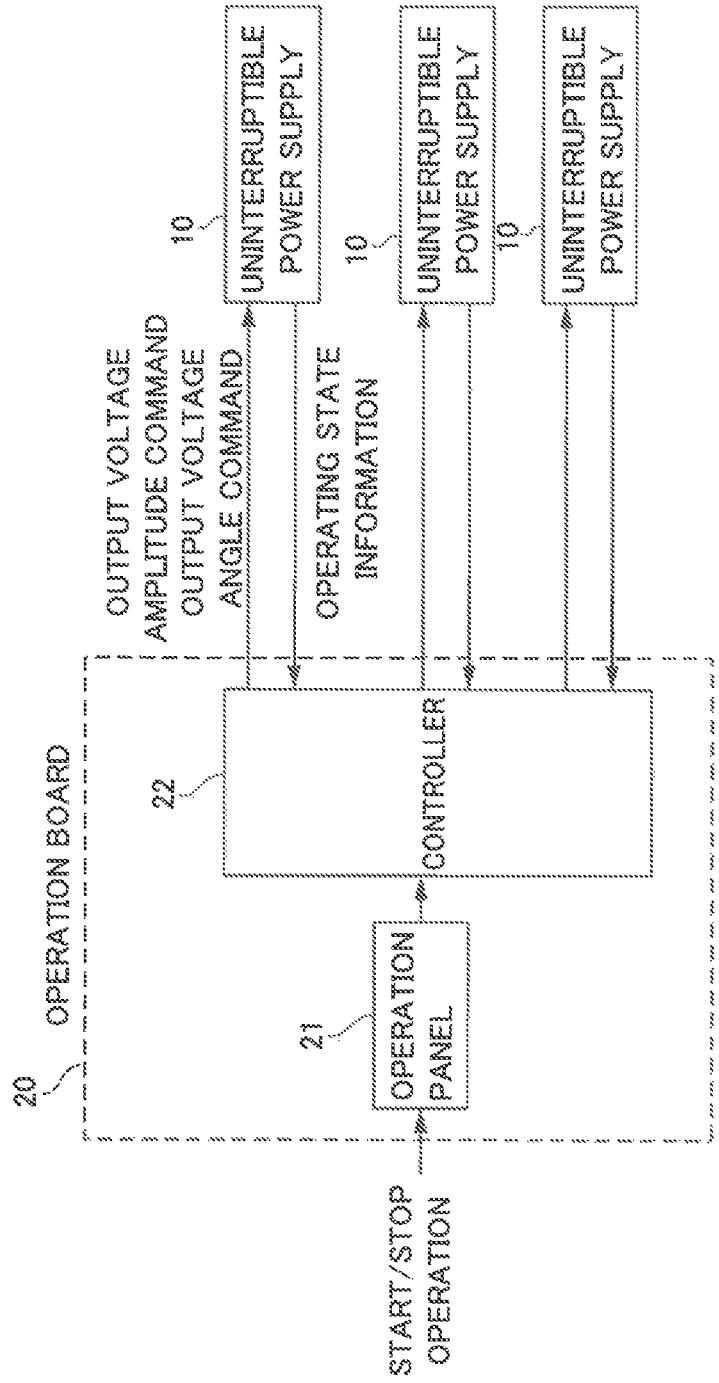
FIG. 2 is another block diagram of the uninterruptible power supply system according to the first embodiment.

As shown in FIG. 2, the uninterruptible power supply system 100 includes an operation board 20. The operation board 20 includes an operation panel 21 and a controller 22. The operation board 20 (controller 22) is configured to transmit commands to a plurality of uninterruptible power supplies 10 via communication. An output voltage amplitude command and an output voltage angle command are transmitted from the controller 22 to each of the plurality of uninterruptible power supplies 10. In addition, operating state information (operating, stopped, etc.) about the uninterruptible power supplies 10 is transmitted via communication from the plurality of uninterruptible power supplies 10 to the operation board 20 (controller 22).

As shown in FIG. 1, an uninterruptible power supply 10 includes a converter 11. The converter 11 is configured to convert AC power supplied from the AC power supply 1 into DC power. Furthermore, a reactor 12 and a capacitor 13 that remove noise are provided between the AC power supply 1 and the converter 11.

The uninterruptible power supply 10 also includes a battery 14. The battery 14 is configured to store the DC power converted by the converter 11. The battery 14 is an example of a "power storage" in the claims.

The uninterruptible power supply 10 also includes an inverter 15. The inverter 15 is configured to convert the DC power supplied from the converter 11 or the battery 14 into AC power. Furthermore, a chopper 16 is provided between the battery 14 and the inverter 15. In addition, an electrolytic capacitor 17 is provided between the converter 11 and the inverter 15. Moreover, a reactor 12 and a capacitor 13 that remove noise are provided between the inverter 15 and the load 2.

The general operation of the uninterruptible power supply 10 is now described. When the AC power supply 1 is normal, the converter 11 converts the AC power supplied from the AC power supply 1 into DC power. The converted DC power is stored in the battery 14, is converted into AC power by the inverter 15, and is supplied to the load 2. When the AC power supply 1 is abnormal, the power stored in the battery 14 is converted by the chopper 16 into DC power that can be used by the inverter 15. Then, the inverter 15 converts the DC power converted by the chopper 16 into AC power and supplies the AC power to the load 2.

The uninterruptible power supply 10 includes a received data analyzer 30. The received data analyzer 30 is configured to analyze whether or not the commands (the output voltage amplitude command and the output voltage angle command) transmitted from the operation board 20 (controller 22) are abnormal. The configuration of the received data analyzer 30 is described below in detail.

The uninterruptible power supply 10 also includes an inverter controller 40, a current detection circuit 41, and a voltage detection circuit 42. When an activation operation is performed via the operation panel 21 of the operation board 20, the controller 22 of the operation board 20 starts calculation of the output voltage commands of the inverter 15. The inverter 15 outputs AC power (voltage), and thus the controller 22 calculates the output voltage amplitude command and the output voltage angle command of the AC voltage. Then, the controller 22 transmits the output voltage amplitude command and the output voltage angle command to the uninterruptible power supply 10 in every predetermined communication cycle. The inverter controller 40 of the uninterruptible power supply 10 adds a correction amount based on an output current value detected by the current detection circuit 41 and an output voltage value detected by the voltage detection circuit 42 to the received output voltage amplitude command and output voltage angle command to generate a switching command for a switching element of the inverter 15. Then, the inverter 15 outputs the commanded AC voltage based on the generated switching command. The above operation is an example.

Figure 3:
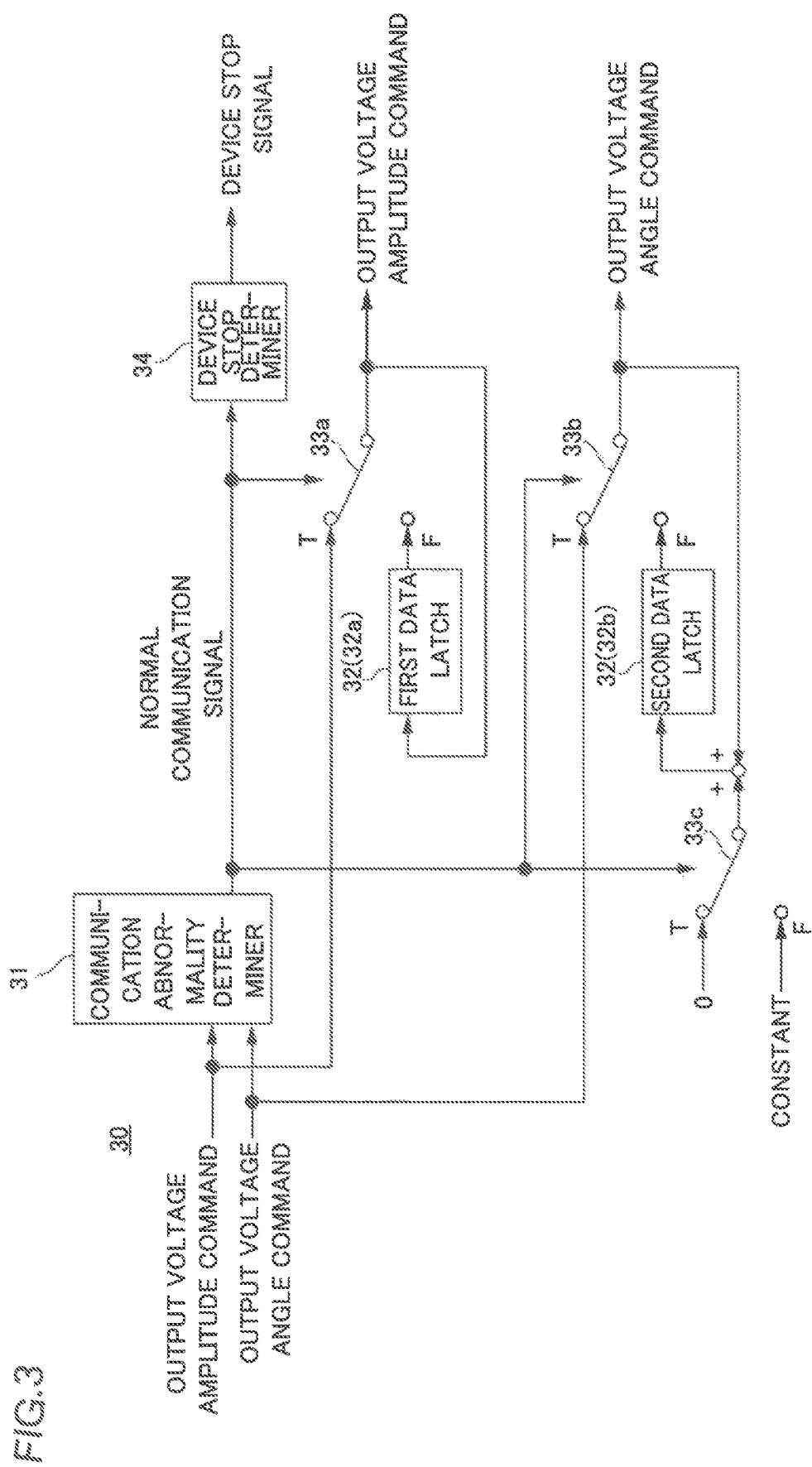
FIG. 3 is a block diagram of a received data analyzer according to the first embodiment.

The configuration of the received data analyzer 30 is now described in detail. As shown in FIG. 3, the received data analyzer 30 includes a communication abnormality determiner 31. The communication abnormality determiner 31 collects all data (received data such as the output voltage amplitude command and the output voltage angle command) transmitted from the operation board 20. Then, the communication abnormality determiner 31 determines whether or not there is an abnormality in communication (received data). When determining that the communication is normal, the communication abnormality determiner 31 outputs an H-level normal communication signal. In order to determine whether or not the communication is normal, normal determination data such as a parity bit or a sum value is additionally transmitted. When the recalculated parity bit or sum value from the received data matches the transmitted parity bit or sum value, it is determined that the communication is normal. The above method is an example. Furthermore, the data from the controller 22 is received in every predetermined communication cycle, and thus determination as to whether or not the communication is normal is performed in every communication cycle. Furthermore, the determined result is latched until the next data is received.

In the first embodiment, the received data analyzer 30 of the uninterruptible power supply 10 includes a data latch 32 that holds a command to the inverter 15. The data latch 32 includes a first data latch 32a that holds the output voltage amplitude command and a second data latch 32b that holds the output voltage angle command. The first data latch 32a holds the output voltage amplitude command in the preceding communication cycle. The second data latch 32b holds the output voltage angle command in the preceding communication cycle. The data latch 32 is an example of a "holder" in the claims. The first data latch 32a and the second data latch 32b are examples of a "first holder" and a "second holder" in the claims, respectively.

When it is determined that the communication is normal, the received commands (the output voltage amplitude command and the output voltage angle command) are not corrected, and are passed to the inverter controller 40. That is, a switch 33a, a switch 33b, and a switch 33c are connected to the T sides. At this time, the latest commands (the output voltage amplitude command and the output voltage angle command) are stored in the data latch 32.

In the first embodiment, when it is determined that the communication is abnormal (when the communication between the operation board 20 and the uninterruptible power supply 10 is abnormal), the uninterruptible power supply 10 operates based on the commands to the inverter 15 held (stored) in the data latch 32 before a communication abnormality occurs. Specifically, when it is determined that the communication is abnormal, the output voltage amplitude command held (stored) in the first data latch 32a is referred to. That is, the switch 33a is connected to the F side. This output voltage amplitude command corresponds to the output voltage amplitude command in the preceding normal communication. The uninterruptible power supply 10 is configured to output an AC voltage having a constant amplitude and frequency. Therefore, the output voltage amplitude command hardly changes during the period of one cycle of communication. Thus, even when the preceding output voltage amplitude command is used, there is no influence (problem) on continuation of the operation for a short time. Moreover, the preceding output voltage amplitude command is normal, and thus the uninterruptible power supply 10 operates in a relatively stable state.

In the first embodiment, when it is determined that the communication is abnormal, the uninterruptible power supply 10 operates based on a value obtained by adding a predetermined value (constant) corresponding to the amount of angle change after holding of the preceding output voltage angle command to the preceding output voltage angle command held in the second data latch 32b. That is, the switch 33b and the switch 33c are connected to the F sides. The communication cycle and the output frequency of the inverter 15 are fixed (constant), and thus it is possible to accurately estimate (calculate) the amount of change in the output voltage angle command in one communication cycle. Therefore, the amount of change (the amount of angle change after holding of the preceding output voltage angle command) in the output voltage angle command in one communication cycle is held in advance as a predetermined value (constant), and when it is determined that the communication is abnormal, the switch 33c is connected to the F side, and the constant is added to the preceding output voltage angle command held in the second data latch 32b such that an output voltage angle command estimated to be transmitted next can be accurately calculated. Thus, even when it is determined that the communication is abnormal, the uninterruptible power supply 10 can continuously operate.

Even when the uninterruptible power supply 10 continuously operates, as described above, errors may occur (become relatively large) between the corrected commands (the output voltage amplitude command and the output voltage angle command) and the true commands (commands to be transmitted when communication is normal). In this case, the continuous operation of the uninterruptible power supply 10 as described above (based on the preceding output voltage amplitude command and output voltage angle command) is not preferable in terms of reliability of power supply to the load 2.

Therefore, the received data analyzer 30 includes a device stop determiner 34. In the first embodiment, the uninterruptible power supply 10 (device stop determiner 34) is configured to stop operating when a communication abnormality continues for a predetermined time, or a communication abnormality occurs for a predetermined number of times within a certain period in a state in which the uninterruptible power supply 10 (device stop determiner 34) is operating based on the previous (preceding) commands to the inverter 15. The device stop determiner 34 is configured to output a device stop signal when stopping the uninterruptible power supply 10. The uninterruptible power supply 10 in which the device stop signal is output stops operating whereas the uninterruptible power supply 10 in which the device stop signal is not output continuously operates.

Figure 4:
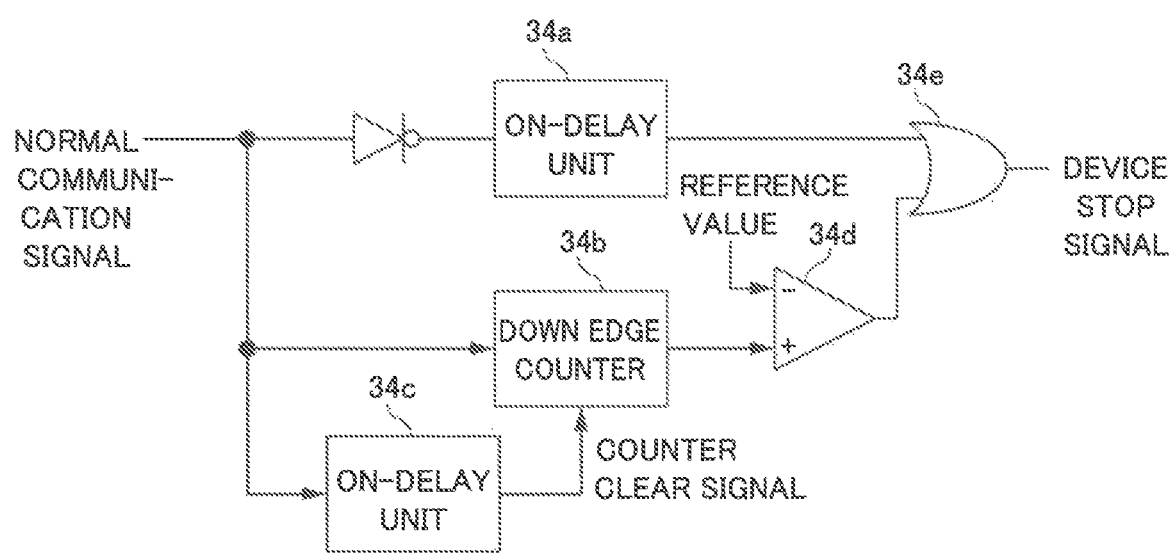
FIG. 4 is a block diagram (circuit diagram) of a device stop determiner according to the first embodiment.

The configuration of the device stop determiner 34 is now described in detail with reference to FIG. 4. The device stop determiner 34 includes an on-delay unit 34a (on-delay timer). An inverted signal of a normal communication signal is input to the on-delay unit 34a. When a communication abnormality continues for a predetermined time, the on-delay unit 34a (OR circuit 34e) outputs the device stop signal. Note that a case in which a communication abnormality continues for a predetermined time refers to a case in which communication cannot be performed at all due to a disconnection of a communication line or an internal failure of a communication circuit.

The device stop determiner 34 also includes a down edge counter 34b, an on-delay unit 34c (on-delay timer), and a comparator 34d. The number of times a communication abnormality occurs is counted by the down edge counter 34b. When the comparator 34d determines that the count value is equal to or larger than a reference value, the device stop signal is output from the comparator 34d (OR circuit 34e). The normal communication signal is also input to the on-delay unit 34c. Then, the down edge counter 34b is cleared (the count value is set to zero) based on the output from the on-delay unit 34c. Thus, it is possible to detect whether or not a communication abnormality has occurred for a predetermined number of times within a certain period. A case in which a communication abnormality occurs for a predetermined number of times within a certain period refers to a case in which the communication line or a component in the communication circuit has a poor contact and a communication abnormality sometimes occurs.

The received data analyzer 30 and the device stop determiner 34 can be made by software or hardware.

Advantageous Effects of First Embodiment

According to the first embodiment, the following advantageous effects are achieved.

According to the first embodiment, as described above, the uninterruptible power supply 10 is configured to operate based on the commands to the inverter 15 held in the data latch 32 before a communication abnormality occurs when an abnormality occurs in communication between the operation board 20 and the uninterruptible power supply 10. Accordingly, even when the abnormality occurs in the communication, the uninterruptible power supply 10 operates based on the commands to the inverter 15 held in the data latch 32 before the abnormality occurs in the communication. Consequently, even when the communication between the operation board 20 and the uninterruptible power supply 10 is abnormal, a decrease in the power supply capacity can be significantly reduced or prevented.

According to the first embodiment, as described above, the uninterruptible power supply 10 is configured to operate based on the previous output voltage amplitude command held in the first data latch 32a and the previous output voltage angle command held in the second data latch 32b when an abnormality occurs in the communication. Accordingly, AC power can be output from the inverter 15 based on the previous output voltage amplitude command held in the first data latch 32a and the previous output voltage angle command held in the second data latch 32b. Thus, a decrease in the AC power supply capacity can be significantly reduced or prevented.

According to the first embodiment, as described above, the uninterruptible power supply 10 is configured to operate based on the preceding output voltage amplitude command held in the first data latch 32a and the value obtained by adding the predetermined value corresponding to the amount of angle change after holding of the preceding output voltage angle command to the preceding output voltage angle command held in the second data latch 32b when an abnormality occurs in the communication. Accordingly, the uninterruptible power supply 10 operates based on the (preceding) output voltage amplitude command immediately before the occurrence of the abnormality in the communication, and thus AC power having an output voltage amplitude substantially similar to the output voltage amplitude immediately before the occurrence of the abnormality in the communication can be output. Furthermore, the predetermined value corresponding to the amount of angle change after holding of the preceding output voltage angle command is added to the preceding output voltage angle command held in the second data latch 32b, and thus AC power having an output voltage angle changed according to the elapse of the period can be output.

According to the first embodiment, as described above, the uninterruptible power supply 10 is configured to stop operating when the communication abnormality continues for the predetermined time, or the communication abnormality occurs for a predetermined number of times within the certain period in a state in which the uninterruptible power supply 10 is operating based on the previous commands to the inverter 15. Accordingly, it is possible to significantly reduce or prevent malfunction of the uninterruptible power supply 10 due to the fact that normal commands are not transmitted from the operation board 20 to the uninterruptible power supply 10. Thus, a decrease in the reliability of power supply to the load 2 can be significantly reduced or prevented.

Second Embodiment

The configuration of an uninterruptible power supply system 200 according to a second embodiment is now described with reference to FIGS. 5 and 6. In general, the capacity (the number of uninterruptible power supplies 10) of the uninterruptible power supply system 200 may be selected with a margin (redundancy) with respect to the load capacity. In this case, for the purpose of improving the efficiency and extending the life of the uninterruptible power supply system 200, the uninterruptible power supply system 200 may operate while some of the uninterruptible power supplies 10 are stopped. In the second embodiment, continuation of the operation at the time of communication abnormality in the configuration of the uninterruptible power supply system 200 having redundancy is described.

Figure 5:
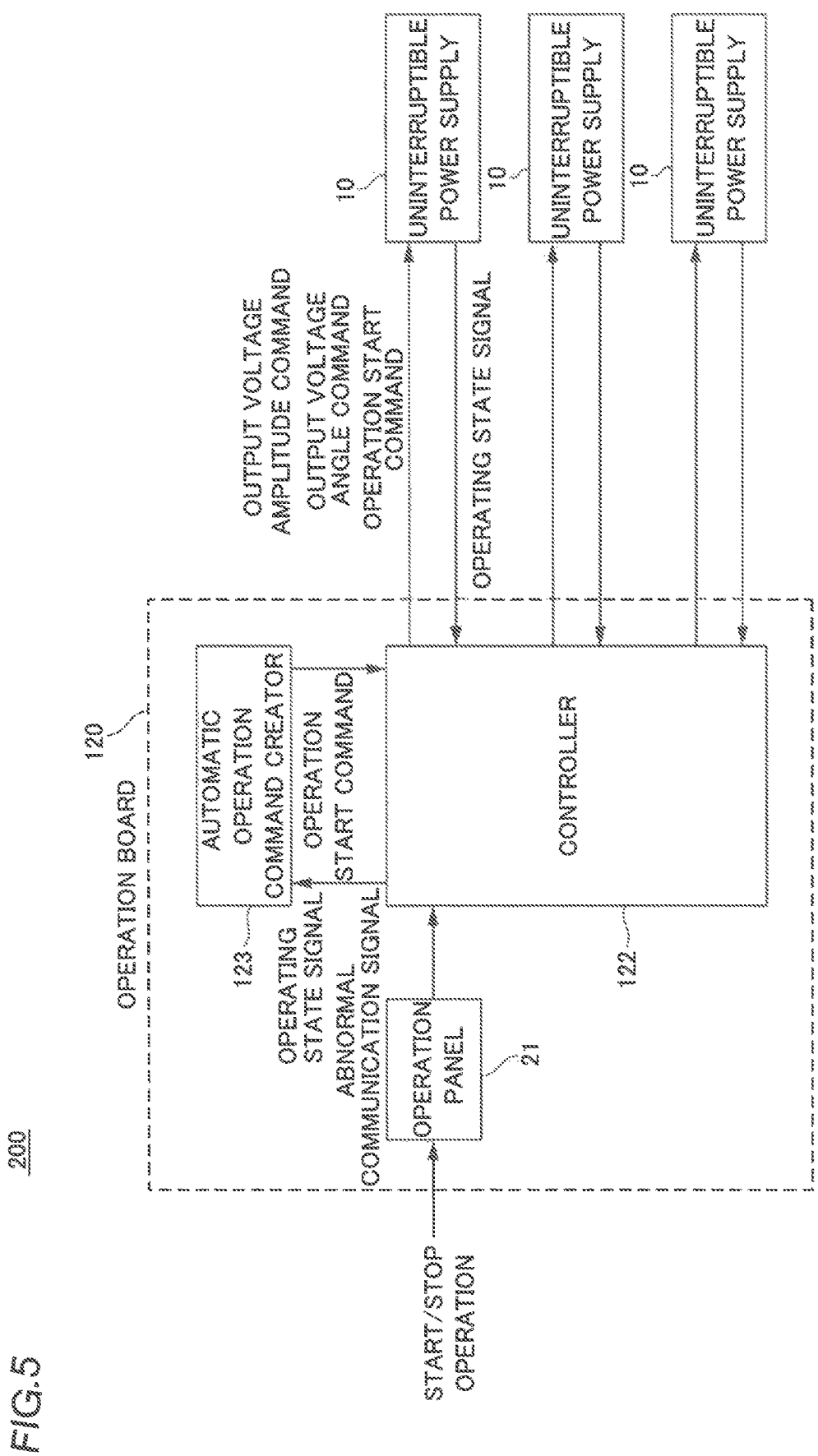
FIG. 5 is a block diagram of an uninterruptible power supply system according to a second embodiment.

As shown in FIG. 5, the uninterruptible power supply system 200 includes a plurality of (three, for example) uninterruptible power supplies 10 connected in parallel to each other. A controller 122 of an operation board 120 performs bidirectional communication with each uninterruptible power supply 10 and receives, from the uninterruptible power supply 10, an operating state signal indicating whether or not the uninterruptible power supply 10 is operating. The operating state signal becomes H-level when the uninterruptible power supply 10 is operating. Moreover, in all the uninterruptible power supplies 10, it is determined whether or not the communication is abnormal. A method for determining whether or not the communication is abnormal is the same as that in the first embodiment. The result (abnormal communication signal) of the determination as to whether or not the communication is abnormal is also transmitted from the uninterruptible power supply 10 to the controller 122 of the operation board 120. The operation board 120 includes an automatic operation command creator 123. The automatic operation command creator 123 receives the operating state signal (information about whether the uninterruptible power supply 10 is operating or stopped) and an abnormal communication signal. In the second embodiment, the operation board 120 stops the uninterruptible power supply 10 with a communication abnormality and starts the operation of a stopped uninterruptible power supply 10 when an abnormality occurs in the communication between the operation board 120 and the uninterruptible power supply 10.

The configuration of the automatic operation command creator 123 is now described in detail with reference to FIG. 6. In the second embodiment, the automatic operation command creator 123 transmits an operation start command to a stopped uninterruptible power supply 10 when a communication abnormality occurs and there is the stopped uninterruptible power supply 10 among the plurality of uninterruptible power supplies 10. Thus, the operation of the stopped uninterruptible power supply 10 is started. On the other hand, the uninterruptible power supply 10 with a communication abnormality is stopped. However, the operation of the uninterruptible power supply 10 that is an alternative thereto is started, and thus the operation of the uninterruptible power supply system 200 can be continued.

Specifically, the automatic operation command creator 123 includes an OR circuit 123a. An inverted signal of the operating state signal transmitted from each uninterruptible power supply 10 is input to the OR circuit 123a. When there is a stopped uninterruptible power supply 10 among the plurality of uninterruptible power supplies 10, an H-level signal (signal indicating that there is a stopped device) is output from the OR circuit 123a.

The automatic operation command creator 123 includes an OR circuit 123b. The abnormal communication signal transmitted from each uninterruptible power supply 10 is input to the OR circuit 123b. When at least one of the plurality of uninterruptible power supplies 10 has an abnormal communication, an H-level signal (signal indicating that there is a device with a communication abnormality) is output from the OR circuit 123b.

The automatic operation command creator 123 includes an AND circuit 123c. The AND circuit 123c outputs the operation start command for the uninterruptible power supply 10 when the H-level signal (signal indicating that there is a stopped device) is output from the OR circuit 123a and the H-level signal (signal indicating that there is a device with a communication abnormality) is output from the OR circuit 123b. This operation start command is automatically transmitted from the automatic operation command creator 123 (controller 122) to the uninterruptible power supply 10 without operating the operation panel 21. The operation start command may be transmitted to all the uninterruptible power supplies 10 or may be transmitted to the stopped uninterruptible power supply 10 (one or all).

The automatic operation command creator 123 can be made by software or hardware.

Advantageous Effects of Second Embodiment

According to the second embodiment, the following advantageous effects are achieved.

According to the second embodiment, as described above, the operation board 120 is configured to receive, via communication, information about whether each of the plurality of uninterruptible power supplies 10 is operating or stopped, and stop the uninterruptible power supply 10 with a communication abnormality and start the operation of the stopped uninterruptible power supply 10 when an abnormality occurs in the communication between the operation board 120 and the uninterruptible power supply 10. Accordingly, even when the uninterruptible power supply 10 with a communication abnormality is stopped, the operation of the stopped uninterruptible power supply 10 is started instead. Therefore, a decrease in the power supply capacity can be further significantly reduced or prevented.

Modified Examples

The embodiments disclosed this time must be considered as illustrative in all points and not restrictive. The scope of the present invention is not shown by the above description of the embodiments but is limited by the scope of claims for patent, and all modifications (modified examples) within the meaning and scope equivalent to the scope of claims for patent are further included.

For example, while a plurality of uninterruptible power supplies is provided in the aforementioned first embodiment, the present invention is not restricted to this. The present invention (first embodiment) can be applied to an uninterruptible power supply system in which only one uninterruptible power supply is provided.

While the output voltage amplitude command and the output voltage angle command are transmitted from the operation board to the inverter in each of the aforementioned first and second embodiments, the present invention is not restricted to this. For example, commands other than the output voltage amplitude command and the output voltage angle command may alternatively be transmitted from the operation board to the inverter.

While the data latch is applied as the holder according to the present invention in each of the aforementioned first and second embodiments, the present invention is not restricted to this. For example, a circuit other than the data latch may alternatively be applied as the holder.

While the uninterruptible power supply operates based on the preceding output voltage amplitude command and the preceding output voltage angle command when the communication is abnormal in each of the aforementioned first and second embodiments, the present invention is not restricted to this. For example, when an abnormality occurs in the communication, the uninterruptible power supply may alternatively operate based on the previous output voltage amplitude command and output voltage angle command other than the preceding ones.

While the uninterruptible power supply with a communication abnormality is stopped when an abnormality occurs in the communication in the aforementioned second embodiment, the present invention is not restricted to this. For example, when an abnormality occurs in the communication, the uninterruptible power supply may alternatively operate based on the preceding commands as in the first embodiment. Then, the operation of the uninterruptible power supply may alternatively be stopped when the communication abnormality continues for a predetermined time or when the communication abnormality occurs for a predetermined number of times within a certain period. Then, the operation of the stopped uninterruptible power supply may alternatively be started. That is, the configuration of the first embodiment and the configuration of the second embodiment may alternatively be combined.

When an abnormality occurs in the communication and there is a stopped uninterruptible power supply, the operation of the stopped uninterruptible power supply may alternatively be started, and when an abnormality occurs in the communication and there is not a stopped uninterruptible power supply, the uninterruptible power supply may alternatively operate based on the preceding commands as in the first embodiment.

What is claimed is:

1. An uninterruptible power supply system comprising:
   an uninterruptible power supply provided between an AC power supply and a load; and
   an operation board that transmits an output voltage amplitude command and an output voltage angle command periodically to the uninterruptible power supply via communication; wherein
   the uninterruptible power supply includes:
   a converter that converts AC power supplied from the AC power supply into DC power;
   a power storage that stores the DC power converted by the converter;
   an inverter that converts the DC power supplied from the converter or the power storage into AC power based on the output voltage amplitude command and the output voltage angle command when it is normally received via the communication; and
   a hold circuit that holds the output voltage amplitude command and the output voltage angle command to the inverter; and
   the uninterruptible power supply operates based on the output voltage amplitude command and the output voltage angle command to the inverter held in the hold circuit before an abnormality occurs in the communication when the abnormality occurs in the communication between the operation board and the uninterruptible power supply.

2. The uninterruptible power supply system according to claim 1, wherein
   the operation board transmits the output voltage amplitude command and the output voltage angle command to the inverter via the communication in every predetermined communication cycle;
   the hold circuit includes a first hold circuit that holds the output voltage amplitude command, and a second hold circuit that holds the output voltage angle command; and
   the uninterruptible power supply operates based on a previous output voltage amplitude command held in the first hold circuit and a previous output voltage angle command held in the second hold circuit when the abnormality occurs in the communication.

3. The uninterruptible power supply system according to claim 2, wherein
the uninterruptible power supply operates based on the previous output voltage amplitude command held in the first hold circuit and a value obtained by adding a predetermined value, corresponding to an amount of angle change over the predetermined communication cycle after holding of the previous output voltage angle command, to the previous output voltage angle command held in the second hold circuit when the abnormality occurs in the communication.

4. The uninterruptible power supply system according to claim 1, wherein the uninterruptible power supply stops operating when the abnormality in the communication continues for a predetermined time, or the abnormality in the communication occurs for a predetermined number of times within a certain period in a state in which the uninterruptible power supply is operating based on a previous command to the inverter.

5. The uninterruptible power supply system according to claim 1, wherein
the uninterruptible power supply system includes a plurality of uninterruptible power supplies connected in parallel to each other; and
the operation board receives, via communication with the plurality of uninterruptible power supplies, information about whether each of the plurality of uninterruptible power supplies is operating or stopped, and stops an uninterruptible power supply with a communication abnormality among the plurality of uninterruptible power supplies and starts operation of a stopped uninterruptible power supply among the plurality of uninterruptible power supplies when the abnormality occurs in the communication between the operation board and one of the plurality of uninterruptible power supplies.

6. An uninterruptible power supply system comprising:
a plurality of uninterruptible power supplies connected in parallel to each other between an AC power supply and a load; and
an operation board that transmits a command periodically to the plurality of uninterruptible power supplies via communication; wherein
each of the plurality of uninterruptible power supplies includes:
a converter that converts AC power supplied from the AC power supply into DC power;
a power storage that stores the DC power converted by the converter;
an inverter that converts the DC power supplied from the converter or the power storage into AC power based on the command when it is normally received via the communication; and
a hold circuit that holds the command to the inverter; and
the operation board receives, via the communication, information about whether each of the plurality of uninterruptible power supplies is operating or stopped, and stops an uninterruptible power supply with a communication abnormality among the plurality of uninterruptible power supplies after operating the uninterruptible power supply with the communication abnormality based on the command held in the hold circuit before the communication abnormality occurs and starts operation of a stopped uninterruptible power supply among the plurality of uninterruptible power supplies when an abnormality occurs in the communication between the operation board and one of the plurality of uninterruptible power supplies.

7. An uninterruptible power supply provided between an AC power supply and a load, the uninterruptible power supply comprising:
a converter that converts AC power supplied from the AC power supply into DC power;
a power storage that stores the DC power converted by the converter;
an inverter that converts the DC power supplied from the converter or the power storage into AC power; and
a hold circuit that holds an output voltage amplitude command and an output voltage angle command to the inverter; wherein
the uninterruptible power supply operates based on the output voltage amplitude command and the output voltage angle command to the inverter held in the hold circuit before an abnormality occurs in communication when the abnormality occurs in the communication between an operation board that transmits the output voltage amplitude command and the output voltage angle command to the uninterruptible power supply via the communication and the uninterruptible power supply.

* * * * *